Figure 1:
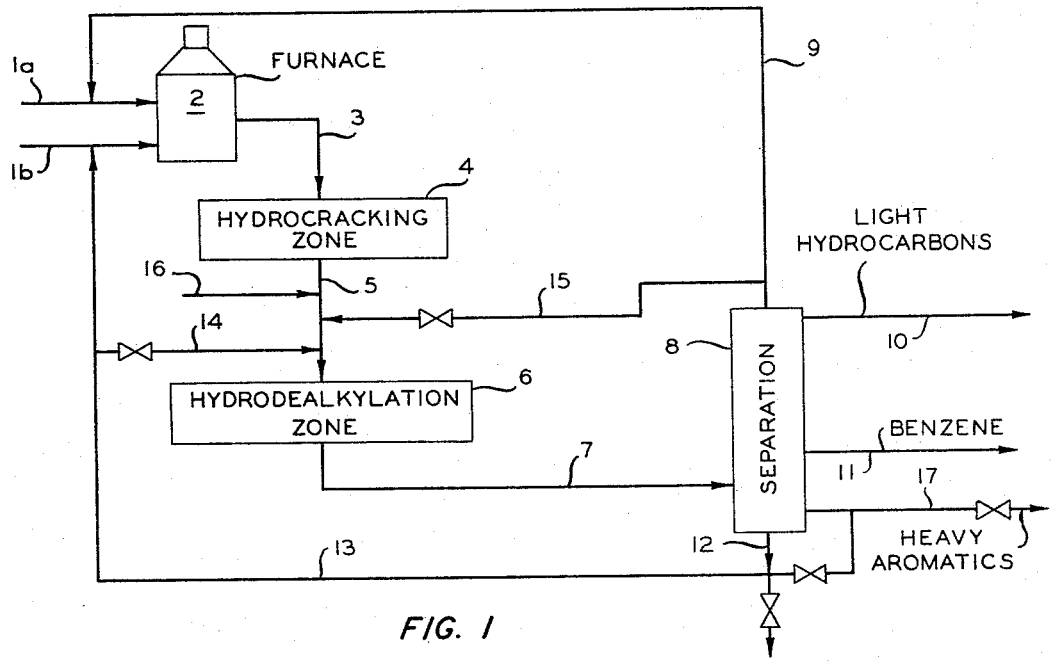

Jan. 3, 1967  J. W. MYERS ET AL  3,296,323
PRODUCTION OF BENZENE
Filed June 30, 1961

INVENTORS
J. W. MYERS
W. C. LANNING
BY
ATTORNEYS

United States Patent Office 3,296,323
Patented Jan. 3, 1967

3,296,323
PRODUCTION OF BENZENE
John W. Myers and William C. Lanning, Bartlesville, Okla., assignors to Phillips Petroleum Company, a corporation of Delaware
Filed June 30, 1961, Ser. No. 121,016
10 Claims. (Cl. 260—672)

This invention relates to production of benzene. In one aspect, this invention relates to a process and apparatus for producing benzene which comprises passing a feed stream comprising a major proportion of alkyl aromatic compounds along with a minor proportion of non-aromatic compounds in the presence of added hydrogen to a refractory reaction zone, heating the feed stream in the reaction zone to a temperature of at least about 1100° F., and recovering a benzene-containing stream from the zone. In another aspect, the invention relates to a process and apparatus for hydrodealkylating a stream comprising alkyl aromatic compounds having at most about six alkyl carbon atoms per molecule which comprises passing the stream, heated to a temperature of at least about 1100° F., in the presence of added hydrogen and a minor proportion of non-aromatic hydrocarbons to a reaction zone and recovering from the zone a benzene-containing stream. In still another aspect, this invention relates to a process and apparatus for producing benzene which comprises passing a feed stream comprising alkyl aromatic compounds having at most about six alkyl carbon atoms per molecule to a pre-heating zone, heating the feed stream in the preheating zone to a temperature of at most about 1200° F., recovering the effluent from the preheating zone and passing said effluent to a refractory reaction zone, heating the effluent in the refractory reaction zone, and recovering from the refractory reaction zone a benzene-containing stream. In yet another aspect, the invention relates to a process and apparatus for hydrodealkylating a stream comprising alkyl aromatic compounds having at most about six alkyl carbon atoms per molecule which comprises passing the stream to a pre-heating zone in the presence of a minor proportion of non-aromatic compounds and added hydrogen, heating the stream in the pre-heating zone by substantial hydrocracking of the non-aromatic compounds to a temperature of at most about 1200° F., recovering the effluent from the pre-heating zone and passing the effluent to a refractory reaction zone, heating the effluent in the refractory reaction zone to a temperature in the range of from about 1100° F. to about 1500° F., recovering from the reaction zone a second effluent stream, separating the second effluent stream into a first benzene-containing product fraction and a second heavy fraction boiling above about 500° F., and returning the second heavy fraction to the process. In still another aspect, this invention relates to a process and apparatus for thermal hydrodealkylation of a feed stream comprising alkyl aromatic compounds which comprises passing said feed stream in the presence of added hydrogen to a reaction zone in which hydrodealkylation causes heating of said feed stream in said reaction zone, passing the resulting hydrodealkylated stream to a separation zone, recovering from said separation zone a hydrodealkylated product and a heavy ends product, returning at least a portion of said heavy ends product to said feed stream and adding to the returned portion sufficient non-aromatic compounds to maintain the rate of hydrodealkylation at least as high as it would be under similar hydrodealkylation conditions in the absence of said step of returning.

As is known in the art, various processes have been utilized in the past for preparation of benzene and for hydrodealkylation of an alkyl aromatic stream. In catalytic processes, there are encountered the usual operational and cost difficulties of preparing and maintaining an active catalyst bed. Further, at the temperature prevailing in a reaction of this type, there is often prevalent the problem of "dusting" of the interior of the reactor surface. This "dusting" of the reactor surface results in degradation and eventual failure of the reactor, and is thought to be caused possibly partly by the presence of both hydrogen and hydrocarbons at the temperatures involved.

Thus, it is an object of this invention to provide a method and apparatus suitable for non-catalytic preparation of benzene from alkyl benzenes. It is another object of this invention to provide a method and apparatus for non-catalytic hydrodealkylation of alkyl aromatic compounds. It is another object of this invention to provide a two-step process and apparatus for preparation of benzene wherein the second or high-temperature step is carried out in a reactor which is not subject to degradative "dusting." It is still another object of this invention to provide a process and apparatus for production of benzene wherein a portion of the preheating of the charge necessary for the thermal hydrodealkylation of the alkyl benzene portion of the feed is provided by the exothermic hydrocracking of non-aromatic compounds also present in the feed. It is another object of this invention to provide a process in which non-aromatic compounds are added with the aromatic feed to the hydrodealkylating step and hydrodealkylation rates are increased. It is still another object of this invention to provide a process in which heavy aromatic products are recycled and non-aromatic hydrocarbons are added in the proper amount so that the hydrodealkylating rate is at least as high as with the pure aromatic feed.

Figure 2:
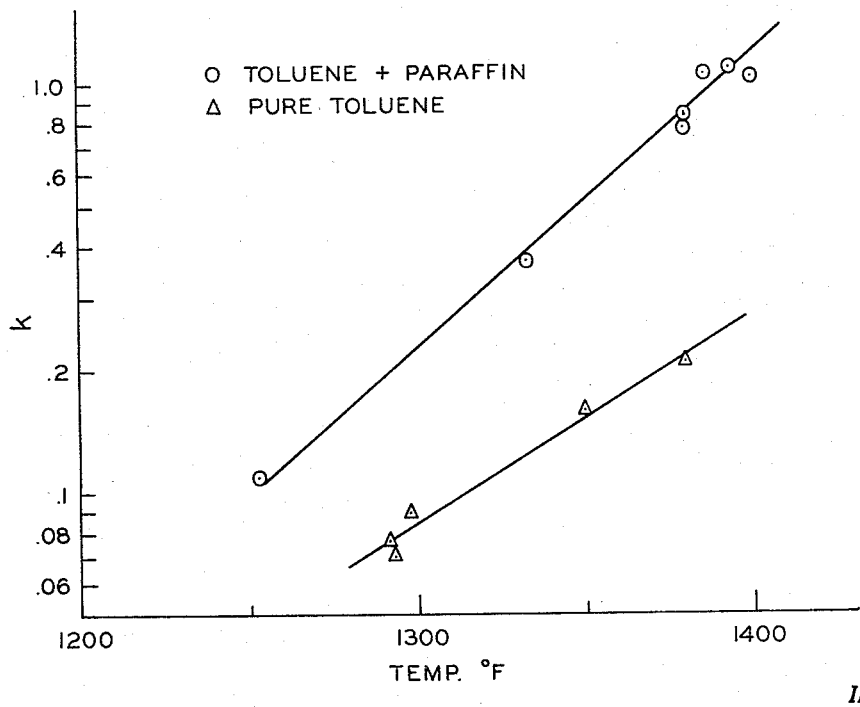

Other aspects, objects, and the several advantages of the invention will become apparent upon study of the disclosure, the claims appended thereto, and the accompanying drawing in which: FIGURE 1 is a schematic flow representation of one embodiment of our invention, and FIGURE 2 is a graph showing the effect of inclusion of paraffins in the hydrodealkylation feed.

We have now discovered that the above objects can be accomplished by a process and apparatus wherein a portion of the heat necessary for hydrodealkylation of alkyl aromatic compounds is furnished by the hydrocracking of a minor proportion of non-aromatic compound at temperatures lower than those at which substantial hydrodealkylation occurs. We have further discovered that undesirable "dusting" of the hydrodealkylation reactor interior surface can be prevented by carrying out the hydrodealkylation reaction within a refractory reaction zone. Although the entire process of our invention can be carried out in a single reaction zone, we have further discovered that a pre-heating of the alkyl aromatic compounds can be advantageously effected by preliminary hydrocracking of a non-aromatic portion of the feed stream in a pre-heating zone, followed by hydrodealkylation of the alkyl aromatic content of the stream in a refractory reaction zone. We have further discovered that addition of non-aromatic hydrocarbon to the feed increases hydrodealkylation rates and that recycle of heavy aromatic products reduces these rates although such recycle increases overall hydrodealkylation efficiency. Moreover, the proper amount of non-aromatic hydrocarbon can be added with the feed to at least compensate for the reduction caused by recycle of heavy aromatic products.

Referring now to the drawings, and to FIGURE 1 in particular, a hydrocarbon feed containing 80 to 95 weight percent alkylaromatics and 5 to 20 weight percent paraffins, naphthenes and/or olefins in charged to furnace 2 through line 1b and hydrogen is charged to this furnace through line 1a. These materials are pre-heated in the furnace and passed through line 3 to hydrocracking zone 4, in which non-aromatics are hydrocracked, either thermally or catalytically, the exothermic heat of reaction serving to complete the pre-heating to thermal hydrodealkylation temperature for the alkylaromatics. The effluent from zone 4 is conducted by way of line 5 to hydrodealkylation zone 6, in which the alkylaromatics are converted to produce benzene. The reactor defining zone 6 is preferably a steel shell provided with an internal refractory lining providing insulation to prevent loss of heat. External insulation can also be provided.

The effluent from zone 6 is conducted by line 7 to separation zone 8, which can comprise, for example, suitable absorbers and fractionators well known in the art. Hydrogen is removed through line 9 and is recycled to line 1a for re-use. Light hydrocarbons boiling below benzene are removed through line 10 to be utilized in any desired manner. Benzene is removed through line 11 as a product of the process, and is conducted to storage, not shown. Heavy ends comprising unconverted alkylbenzenes are removed from zone 8 through line 12; and these are ordinarily recycled through line 13 and line 1b, although they can be removed through line 12 by use of the valving provided. All or a portion of the stream in line 13 can be passed by way of lines 14 and 5 to zone 6, but recycling by way of line 1b is preferred.

Because the hydrocracking reaction consumes hydrogen, hydrogen can be added to line 5 through line 15 to replace part of all of the hydrogen consumed in hydrocracking zone 4 and maintain the desired ratio of hydrogen and hydrocarbon in zone 6 without the hydrogen necessary for this passing through the hydrocracking zone.

Usually, a relatively small amount of heavy aromatics, which is predominantly biphenyl or alkylated biphenyl, is made in the hydrodealkylation step. This can be removed from the separation zone through line 17 or it can be recycled through line 13, by use of the valving provided, with the unconverted feed. At times, it may be necessary to separate a biphenyl concentrate from these heavy products and to recycle only the biphenyl concentrate. When this heavy aromatic product is recycled, overall hydrodealkylation efficiencies are increased but rates are decreased. This reduction can be compensated for by addition of non-aromatic hydrocarbon, for example, through line 16. In one embodiment, the beneficial effect of the addition of non-aromatic to increase hydrodealkylation rates can be used in a one-step process without a preliminary hydrocracking step.

Referring now to FIGURE 2, there is shown the effect of the inclusion of paraffins in the hydrodealkylation feed. This graph is a compilation of the runs in the following two specific examples.

EXAMPLE I—TABLE I

*Effect of temperature and pressure on hydrodealkylation of toluene concentrate [1]*

| Run No. | 1 | 2 | 3 | 4 | 5 | 6 | 7 |
|---|---|---|---|---|---|---|---|
| Process Cond.: | | | | | | | |
| Temp., °F. | 1,253 | 1,333 | 1,380 | 1,379 | 1,386 | 1,394 | 1,399 |
| Press., p.s.i.g. | 605 | 600 | 500 | 500 | 500 | 500 | 300 |
| Time, sec. | 43.6 | 13.7 | 5.9 | 8.3 | 3.6 | 3.6 | 5.3 |
| LHSV | 1.0 | 3.0 | 5.4 | 4.3 | 9.0 | 9.0 | 3.8 |
| $H_2$/feed, mol ratio | 3.8 | 4.0 | 4.2 | 3.6 | 4.1 | 4.1 | 4.1 |
| Reactor effluent composition,[2] wt. percent: | | | | | | | |
| Methane | 18.7 | 19.2 | 18.4 | 19.6 | 17.0 | 17.3 | 18.0 |
| Ethane | 4.3 | 4.5 | 4.4 | 4.2 | 4.5 | 4.3 | 4.2 |
| Propane | trace | trace | trace | trace | trace | trace | trace |
| Benzene | 66.0 | 66.5 | 65.4 | 66.4 | 60.6 | 62.9 | 62.7 |
| Toluene | 6.5 | 5.1 | 6.8 | 3.6 | 13.2 | 10.8 | 10.0 |
| Xylene | 0.2 | trace | 0.2 | 0.1 | 0.5 | 0.2 | 0.3 |
| Heavies (above 350° F.) | 4.3 | 4.7 | 4.8 | 6.1 | 4.2 | 4.5 | 4.8 |
| Total | 100.0 | 100.0 | 100.0 | 100.0 | 100.0 | 100.0 | 100.0 |
| Reactor effluent yield, wt. percent of HC feed | 101.4 | 101.2 | 101.1 | 101.2 | 100.4 | 100.0 | 100.9 |
| Recovery, wt. percent | 98.9 | 98.5 | 98.3 | 98.4 | 98.0 | 97.7 | 98.2 |
| Aromatic conversion, percent | 92.7 | 95.4 | 92.4 | 95.9 | 85.2 | 88.1 | 88.6 |
| Dealkylation efficiency,[3] percent | 92.6 | 91.2 | 91.5 | 89.5 | 91.6 | 91.4 | 91.8 |
| Ultimate yield of heavies, wt. percent | 5.1 | 5.4 | 5.7 | 6.8 | 5.3 | 5.4 | 5.8 |
| Estimated recycle dealkylation efficiency [4] | 95.7 | 94.2 | 94.8 | 93.5 | 94.7 | 94.6 | 94.7 |
| Toluene rate constant k,[5] sec.$^{-1}$ (mol/liter)$^{-1/2}$ | 0.11 | 0.37 | 0.86 | 0.79 | 1.06 | 1.14 | 1.04 |
| Acid wash color of benzene before clay treating | | 3− | 6 | 4 | 4 | 4 | 4+ |

[1] Weight percent composition: non-aromatics (principally dimethylhexanes) 6.4, toluene 83.6, xylene 9.1, $C_9$+ aromatics 0.9.
[2] Calculated on a hydrogen-free basis.
[3] Dealkylation efficiency was calculated from recovery figures rather than on a no-loss basis. Thus the calculated figures are conservative.
[4] It was assumed that recycling heavy aromatics would have the same effect as conversion of 70 percent of the diphenyl to benzene.
[5] The toluene reaction was considered to be first order with respect to aromatic concentration and with rate constant proportional to square root of average hydrogen concentration. This method of handling hydrogen concentration facilitates calculations and gives about the same results as considering the reaction half order with respect to hydrogen.

EXAMPLE II—TABLE II

*Hydrodealkylation of pure toluene*

| Run No. | 8 | 9 | 10 | 11 | 12 |
|---|---|---|---|---|---|
| Process Cond.: | | | | | |
| Temp., F.° | 1,298 | 1,293 | 1,292 | 1,350 | 1,387 |
| Press., p.s.i.g. | 500 | 500 | 500 | 500 | 500 |
| Time, sec. | 65.4 | 77.5 | 49.5 | 36.7 | 18.2 |
| LHSV | 0.52 | 0.45 | 0.69 | 0.91 | 1.78 |
| $H_2$/feed, mol ratio | 4.0 | 3.8 | 3.9 | 3.9 | 4.0 |
| Reactor effluent composition,[1] wt. percent: | | | | | |
| Methane | 16.2 | 16.3 | 15.4 | 16.8 | 14.8 |
| Ethane | 0.6 | 0.4 | 0.4 | 0.5 | 0.5 |
| Propane | 0.0 | 0.0 | 0.0 | 0.0 | 0.0 |
| Benzene | 75.4 | 73.7 | 70.6 | 73.9 | 68.4 |
| Toluene | 3.6 | 4.7 | 9.9 | 3.9 | 12.3 |
| Xylene | trace | 0.0 | trace | trace | trace |
| Heavies (above 350° F.) | 4.2 | 4.8 | 3.7 | 4.9 | 4.0 |
| Total | 100.0 | 100.0 | 100.0 | 100.0 | 100.0 |
| Reactor effluent yield, wt. percent of HC feed | 100.7 | 101.1 | 101.7 | 102.0 | 102.8 |
| Recovery, wt. percent | 98.6 | 98.6 | 99.9 | 99.9 | 101.0 |
| Toluene conversion, percent | 96.4 | 95.3 | 89.9 | 96.0 | 87.4 |
| Dealkylation efficiency,[2] percent | 92.7 | 92.4 | 94.0 | 92.6 | 94.9 |
| Ultimate yield of heavies, wt. percent | 4.5 | 5.2 | 4.3 | 5.2 | 4.7 |
| Estimated recycle dealkylation efficiency,[3] percent | 95.7 | 95.9 | 96.3 | 96.0 | 97.7 |
| Toluene rate constant k,[4] sec.$^{-1}$ (mol/liter)$^{-1/2}$ | 0.09 | 0.07 | 0.08 | 0.16 | 0.21 |

[1] Calculated on a hydrogen-free basis.
[2] Dealkylation efficiency was calculated from recovery figures rather than on a no-loss basis. Thus the calculated figures are conservative.
[3] It was assumed that recycling heavy aromatics would have the same effect as conversion of 70 percent of the diphenyl to benzene.
[4] The hydrodealkylation reaction was considered to be first order with respect to toluene concentration and with rate constant proportional to square root of average hydrogen concentration. This method of handling hydrogen concentraton facilitates calculations and gives about the same results as considering the reaction half order with respect to hydrogen.

The following runs show the effect of feed dilution.

EXAMPLE III—TABLE III

*Effect of hydrogen and methane dilution on hydrodealkylation of toluene concentrate [1]*

| Run No. | 13 | 14 | 15 | 16 | 17 |
|---|---|---|---|---|---|
| Process Cond.: | | | | | |
| Temp., °F | 1,253 | 1,256 | 1,256 | 1,254 | 1,286 |
| Press., p.s.i.g | 605 | 600 | 600 | 600 | 600 |
| Time, sec | 43.6 | 33.7 | 40.3 | 64.2 | 47.8 |
| LHSV | 1.0 | 0.69 | 0.58 | 0.37 | 0.48 |
| $H_2$/feed, mol ratio | 3.8 | 8.2 | 4.1 | 4.0 | 4.3 |
| Methane/feed, mol ratio | 0.0 | 0.0 | 4.1 | 4.0 | 4.3 |
| Reactor effluent composition,[2] wt. percent: | | | | | |
| Methane | 18.7 | 19.6 | 50.4 | 50.7 | 51.1 |
| Ethane | 4.3 | 4.9 | 2.8 | 2.8 | 2.9 |
| Propane | trace | trace | 0.6 | trace | trace |
| Benzene | 66.0 | 69.6 | 35.6 | 38.6 | 40.1 |
| Toluene | 6.5 | 4.1 | 8.2 | 5.6 | 3.1 |
| Xylene | 0.2 | trace | 0.3 | 0.2 | 0.1 |
| Heavies (above 350° F.) | 4.3 | 1.8 | 2.1 | 2.1 | 2.7 |
| Total | 100.0 | 100.0 | 100.0 | 100.0 | 100.0 |
| Reactor effluent yield, wt. percent of HC feed | 101.4 | 101.4 | 101.3 | 99.5 | 100.6 |
| Recovery, wt. percent | 98.9 | 98.7 | 99.7 | 98.3 | 99.1 |
| Aromatic conversion, percent | 92.7 | 95.5 | 84.4 | 89.6 | 94.0 |
| Dealkylation efficiency,[3] percent | 92.6 | 95.1 | 92.8 | 92.5 | 92.8 |
| Ultimate yield of heavies, wt. percent | 5.1 | 2.1 | 4.4 | 4.8 | 6.0 |
| Estimated recycle dealkylation efficiency,[4] percent | 95.7 | 96.3 | 95.4 | 95.3 | 96.3 |
| Toluene rate constant k,[5] sec.$^{-1}$ (mol/liter)$^{-1/2}$ | 0.11 | 0.15 | 0.11 | 0.08 | 0.14 |
| Xylene rate constant k,[5] sec.$^{-1}$ (mol/liter)$^{-1/2}$ | 0.16 | 0.20 | 0.16 | 0.11 | 0.17 |

[1] Weight percent composition: non-aromatics (principally dimethylhexanes) 6.4, toluene 83.6, xylene 9.1, $C_9$+aromatics 0.9.
[2] Calculated on a hydrogen-free basis.
[3] Dealkylation efficiency was calculated from recovery figures rather than on a no-loss basis. Thus the calculated figures are conservative.
[4] It was assumed that recycling heavy aromatics would have the same effect as conversion of 70 percent of the diphenyl to benzene.
[5] The toluene and xylene reactions were both considered to be first order with respect to aromatic concentration and with rate constant proportional to square root of average hydrogen concentration. This method of handling hydrogen concentration facilities calculations and gives about the same results as considering the reaction half order with respect to hydrogen.

In the runs of the preceding three tables, the tests at 1300° F. and lower temperatures were conducted in empty two- and three-foot sections of one-inch schedule 80 A.I.S.I. type 310 stainless steel pipe. A quartz-lined pipe was used in most of the higher temperature tests. Carbon deposition was low. After a 96-hour test at 1253° F. (92.7% conversion level), carbon burned from the reaction pipe was equivalent to only 0.002 weight percent of the feed and no coke was observed carried from the reaction tube by the hydrocarbon.

The following runs were made to show that a non-aromatics in toluene concentrate is converted at lower temperatures than are aromatics (here, 6.4 weight percent non-aromatics in toluene concentrate).

EXAMPLE IV—TABLE IV

*Conversion of non-aromatics in toluene concentrate*

| Process Cond.: | | | |
|---|---|---|---|
| Temp., °F | 846 | 997 | 1169 |
| Press., p.s.i.g | 310 | 310 | 305 |
| Time, sec | 41.3 | 38.5 | 32.9 |
| LHSV | 0.76 | 0.75 | 0.76 |
| $H_2$/feed mol ratio | 3.7 | 3.6 | 3.7 |
| Conversion, percent: | | | |
| Non-aromatics | 2 | 57 | 100 |
| Toluene | 0 | 0 | 35 |

The product benzene had the following properties:

EXAMPLE V—TABLE V

*Specification tests on benzene fractions*

| Test | ASTM Designation | Samples [1] |
|---|---|---|
| Solidification point | D-852-47 [2] | 5.35° C. |
| Distillation | D-850-56 | 79.9-80.8° C. |
| Sp. Gr. (15.56/15.56° C.) | D-891-51 | 0.8848. |
| Color | D-853-47 | Acceptable. |
| Acidity | D-847-47 | No free acid. |
| Acid wash color | D-848-47 | (2-6), 0+.[3] |
| Copper corrosion | D-130-56 [4] | 1 (Sl. tarnish). |
| Sulfur compounds | D-853-47 | No $H_2S$, $SO_2$. |
| Thiophene | D-931-50 | <1 p.p.m. |

[1] Four benzene fractions from products of runs at different temperatures were submitted for specification tests. These fractions constituted the total benzene cuts separated in a Hypercal column. Except in the acid-wash color test, all samples gave substantially the same results.
[2] Method D-1477-57T modified so as to be similar to D-852-47 was used.
[3] Acid wash colors varied from 2 to 6 before clay treating. Samples having 2 and 4 acid wash colors were clay treated. After treating, the colors were 0+.
[4] This is a more stringent test than D-849-47.

EXAMPLE VI

The following thermal tests were at 1210–1340° F., 300 p.s.i.g., with 3.5 mols of hydrogen per mol of toluene, and at about 15 seconds contact time. They were 2–3 hours in length. The reactor was packed with alpha alumina to increase the efficiency of heat transfer and reduce void space. At 1210° F., conversion was only 19 percent but at 1280° F. and 1340° F. both conversion and efficiency were high:

| Temp., °F | 1,210 | 1,280 | 1,340 |
|---|---|---|---|
| Conv., Wt. Percent | 18.5 | 43.9 | 73.3 |
| Efficiency to $C_6H_6$, Wt. Percent | 83.2 | 80.6 | 80.2 |
| Efficiency, Percent of Theory | 98.1 | 95.0 | 94.6 |

Conversion to coke was of the order of 0.1 to 0.2 weight percent of the feed.

EXAMPLE VII

A mixture of 90 weight percent toluene and 10 percent n-octane is thermally hydrocracked at 300 p.s.i.g. with a hydrogen-to-hydrocarbon mol ration of 4. The hydrogen and hydrocarbon are pre-heated and fed to a first reaction zone at an inlet temperature of 1050° F. The contact time in this zone is 35 seconds. At the 1050° F., temperature, substantial amounts of the octane are exothermally hydrocracked, whereas practically none of the toluene reacts. Approximately 85 percent of the octane is converted in this first zone and the outlet temperature is about 1150° F. The effluent then enters a second zone at 1150° F. The contact time in this zone is 60 seconds. At 1150° F. the toluene hydrodealkylates at fast enough rate to give additional temperature rise and the temperature increases from 1150° F. to about 1390° F. in this zone. The overall toluene conversion is about 90 percent.

The conditions for carrying out the hydrodealkylation reaction are as follows:

| Variable | Broad | Preferred |
|---|---|---|
| Temperature, °F | 1,100-1,500 | 1,200-1,400 |
| Contact time, sec | 1-150 | 2-100 |
| Pressure, p.s.i.g | 50-1,000 | 100-600 |
| $H_2$/HC, mol | 1-20 | 1.5-10 |

EXAMPLE VIII

A test was made in which toluene concentrate containing 6.4 weight percent non-aromatics (about 80 percent paraffins and 20 percent naphthenes) mixed with 12 percent of heavy aromatics formed in previous tests was used as feed. Presence of these heavy aromatics increased hydrodealkylating efficiency as calculated from toluene conversion but also reduced rates:

| Feed | Toluene Concentrate Containing 6.4 wt. % Non-aromatics +12% Heavy aromatics | Toluene Concentrate | Pure Toluene |
| --- | --- | --- | --- |
| Temp., °F | 1,329 | 1,333 | 1,350 |
| Pressure, p.s.i.g | 600 | 600 | 500 |
| LHSV | 3.0 | 3.0 | 0.9 |
| $H_2$/feed, mol ratio | 4.1 | 4.0 | 3.9 |
| Dealkylation efficiency, percent | 104.7 | 91.2 | 92.6 |
| Toluene rate constant, sec.$^{-1}$ (mol/liter)$^{-1/2}$ | 0.24 | 0.37 | 0.16 |

These data show that the 6.4 percent non-aromatics more than compensated for the reduction in rate caused by the heavy aromatics. Thus, if the amount of non-aromatics is equal to at least about half of the weight percent of heavy aromatics, the hydrodealkylation rate is at least as high as with pure toluene. FIGURE 2 also shows how the non-aromatics increased hydrodealkylation rates.

The rate of reaction is dependent on the temperature, pressure, and hydrogen concentration; and, therefore, these variables must all be controlled along with the reaction time in order to effect the desired depth of conversion.

The reaction is exothermic, and consequently temperature will increase in the direction of flow of the reactants in an adiabatic reaction zone. The average reaction temperature should be within the range given, although the maximum temperature can be outside these ranges.

Some savings in charge heating is effected by including a limited amount of non-aromatic hydrocarbons in the feed, these including normally liquid paraffins, cycloparaffins and olefins. These non-aromatics begin hydrocracking at a lower temperature than the aromatics, and the exothermic heat of reaction is used for pre-heating the other hydrocarbon reactants (aromatics) and the hydrogen in the stream up to a temperature sufficiently high to effect hydrodealkylation of the aromatics. These hydrocrackable non-aromatics are preferably present in an amount between 5 and 20 weight percent of the aromatic hydrocarbon in the feed. Less than five percent is not deleterious, but is not sufficient to make any really significant saving in heating cost. More than 20 percent of the hydrocrackable non-aromatics can result in excessive temperature rise. Thus, control of the non-aromatic portion of the feed within this range is beneficial. These non-aromatics are hydrocracked principally to normally gaseous paraffins and are advantageously separated from the effluent and used in firing the feed pre-heater. Thus, low octane $C_6$, $C_7$ and $C_8$ refinery streams can be used in this manner to reduce the temperature of the pre-heater, thus increasing furnace tube life, and the products of non-aromatic hydrocracking used as pre-heater fuel.

The conditions for carrying out the hydrocracking step are a feed temperature of 950° F. to 1150° F., preferably 1000° F. to 1100° F., with the contact time, pressure and hydrogen/hydrocarbon mol ratio being within the same ranges as the hydrodealkylation reaction. This reaction is also exothermic and is dependent on temperature, pressure and hydrogen concentration, as well as reaction time. These variables are controlled within the foregoing ranges to effect the final 50° F. to 250° F. of heating of the reactant stream to a temperature in the range of 1100° F. to 1200° F. before entering the hydrodealkylation zone.

The alkylbenzenes used in this process are preferably those with less than six alkyl carbon atoms in the molecule. These are readily separated substantially free of polycyclics such as naphthalene, which polycyclics will not be converted to benzene in substantial amount.

One particular type of reaction vessel is quite advantageous in operating this process, this being a refractory lined steel vessel operated with the steel wall relatively cool. This is essentially an internally insulated vessel. Many of the types of steel commonly used in fabrication of reaction vessels, including 25–20 stainless, form dust upon use in hydrodealkylation. The use of internal insulation and a relatively cold shell avoids this difficulty.

Use of a controlled quantity of paraffins in the feed to generate heat within the reaction zone to furnish the high temperature portion of the pre-heating is quite advantageous in combination with this type of reaction vessel. Steel furnace tubes are also subject to the difficulty of dusting at high temperatures, and effecting the final heating by the hydrocracking paraffins within the refractory lined reaction vessel eliminates contact of the feed with the furnace tube walls in the most deleterious temperature range.

Although we have discussed our invention only in conjunction with a thermal, i.e. non-catalytic, process, we have further discovered that in another preferred embodiment the feed material comprising aromatic hydrocarbons with a minor proportion (as related to aromatic hydrocarbons) of a non-aromatic feed can be preheated so as to initiate cracking of the non-aromatic portion in a catalytic hydrocracking zone. This initial preheating is continued up to a temperature below where "dusting" of the reactor begins, and the material is then passed to a refractory lined thermal zone wherein additional exothermic hydrocracking of the non-aromatic portion furnishes a portion of the pre-heat necessary to thermally dealkylate the aromatic portion of the feed.

Reasonable variation and modification are possible within the scope of the disclosure, drawings, and appended claims to the invention, the essence of which is that there is provided process and apparatus for production of benzene from a feed comprising a major proportion of alkly aromatic compounds and a minor proportion of non-aromatic compounds wherein pre-heating of the feed is accomplished by cracking of non-aromatics and wherein hydrodealkylation is carried out in a refractory lined reaction zone, and wherein the rate of hydrodealkylation in the presence of recycled heavy ends is maintained by addition of non-aromatic compounds.

We claim:

1. A process for hydrodealkylating a stream comprising alkyl aromatic compounds having at most about six alkyl carbon atoms per molecule which comprises passing said stream to a pre-heating zone, adding hydrogen and a minor proportion of $C_6$–$C_8$ non-aromatic compounds sufficient to heat said stream in said pre-heating zone from about 900° F. to a temperature of at most about 1200° F. by substantial hydrocracking of said non-aromatic compounds, said heating in said hydrocracking zone resulting from said hydrocracking reaction only, recovering the effluent from said pre-heating zone and passing said effluent to a reaction zone defined by refractory surfaces, heating said effluent in said reaction zone to a temperature in the range of from about 1100° F. to about 1500° F., recovering from said reaction zone a second effluent stream, separating said second effluent stream into a first benzene-containing product fraction and a second heavy fraction boiling above about 500° F., and returning said second heavy fraction as a portion of said stream to the process.

2. The process of claim 1 wherein said minor proportion comprises fom about 5 to about 20 weight percent of normally-liquid paraffins.

3. The process of claim 1 wherein said minor proportion comprises from about 5 to about 20 weight percent of naphthenic hydrocarbons.

4. The process of claim 1 wherein said pre-heating zone contains a cracking catalyst.

5. A process for hydrodealkylating a stream comprising at least one alkylbenzene compound having at most about six alkyl carbon atoms per molecule which comprises introducing said stream, hydrogen and a minor amount of non-aromatic hydrocarbons at a temperature in the range of 950° F. to 1150° F. into a hydrocracking zone for hydrocracking of the said non-aromatic hydrocarbons hydrocracking said non-aromatic hydrocarbons, using the heat of said hydrocracking reaction only to increase the temperature of said stream in the range of 50° F. to 250° F., introducing the reaction mixture of said hydrocracking zone into a hydrodealkylation zone defined by refractory surfaces at a temperature of 1100° F. to 1200° F., hydrodealkylating said alkylbenzene in said hydrodealkylation zone at an average temperature in the range of 1100° F. to 1500° F., and recovering a benzene containing stream from said hydrodealkylation zone.

6. A process for thermal hydrodealkylation of a heated feed stream comprising alkyl aromatic compounds which comprises pasing said heated feed stream in the presence of added hydrogen to a reaction zone defined by refractory surfaces, further heating said feed stream in said reaction zone by hydrodealkylation, passing the resulting hydrodealkylated stream to a separation zone, recovering from said separation zone a hydrodealkylated product and a heavy ends product containing at least one member selected from a group consisting of biphenyl and alkylated biphenyl, returning at least a portion of said heavy ends product to said feed stream, and adding to the returned portion sufficient $C_6$–$C_8$ non-aromatic compounds to maintain the rate of hydrodealkylation at least as high as it would be under similar hydrodealkylation conditions in the absence of said step of returning.

7. The process of claim 6 wherein the added non-aromatics equal at least about half the amount expressed in weight percent of said returned portion.

8. A process for producing benzene from a feed stream comprising alkyl aromatic compounds having at most about six alkyl carbon atoms per molecule which comprises introducing said stream and a minor proportion of a normally liquid paraffin to a pre-heating zone, heating said feed stream in said pre-heating zone, passing the thus pre-heated feed stream in the presence of hydrogen to a hydrocracking zone whereby at least a portion of said paraffin is hydrocracked and the heat solely resulting from the exothermic hydrocracking further raises the temperature of the feed stream, there being no other source of heat to raise the temperature of said feed stream, passing the resulting stream to a reaction zone defined by refractory surfaces to effect hydrodealkylation of at least a portion of said alkyl aromatic compounds, and separating from the resulting stream a benzene-containing product stream.

9. A process for hydrodealkylating a stream comprising at least one alkyl benzene having at most six alkyl carbon atoms per molecule which comprises the steps of:

(a) admixing with said stream hydrogen and a minor amount of a compound selected from $C_6$–$C_8$ non-aromatic hydrocarbons,
(b) preheating the admixture of step (a) to a temperature in the range of 950° F. to 1150° F.,
(c) passing the heated stream of step (b) to a hydrocracking zone,
(d) hydrocracking in the said hydrocracking zone a portion of the said non-aromatic hydrocarbon of step (a) sufficiently to increase the temperature of said heated steam by exothermic reaction to incipient hydrodealkylation temperature, the hydrocracking reaction providing the sole source of heat for increasing the temperature of said heated stream,
(e) passing the effluent of step (d) to a reaction zone defined by refractory surfaces to effect hydrodealkylation of at least a portion of said alkyl benzene and
(f) separating from the effluent of step (e) a benzene containing product stream.

10. A process for hydrodealkylating a stream consisting essentially of an alkyl benzene concentrate having at most six alkyl carbon atoms per molecule which comprises the steps of:

(a) admixing with said stream hydrogen and a minor amount of a compound selected from $C_6$–$C_8$ paraffins,
(b) preheating the admixture of step (a) to a temperature in the range of 950° F. to 1150° F.,
(c) passing the heated stream of step (b) to a hydrocracking zone,
(d) hydrocracking in the said hydrocracking zone a portion of the said paraffins of step (a) sufficient to increase the temperature of said heated stream 50 to 250° F. by exothermic reaction, the hydrocracking reaction providing the sole source of heat for increasing the temperature of said heated stream,
(e) passing the effluent of said (d) to a reaction zone defined by refractory surfaces to effect hydrodealkylation of at least a portion of said alkyl benzene and
(f) separating from the effluent of step (e) a benzene containing product stream.

References Cited by the Examiner

UNITED STATES PATENTS

| | | | |
|---|---|---|---|
| 1,230,087 | 6/1917 | Evans | 260—672 |
| 1,890,437 | 12/1932 | Pier | 208—59 |
| 1,958,528 | 5/1934 | Wilson | 208—59 |
| 1,960,206 | 5/1934 | Edmonds | 208—59 |
| 2,381,522 | 8/1945 | Stewart | 260—672 |
| 2,396,761 | 3/1946 | Tilton | 260—672 |
| 2,674,635 | 4/1954 | Beckberger | 260—672 |
| 2,709,193 | 5/1955 | Clough | 260—672 |
| 2,907,800 | 10/1959 | Mertes | 260—672 |
| 2,929,775 | 3/1960 | Aristoff et al. | 260—672 |
| 2,945,800 | 7/1960 | Ciapetta et al. | 208—59 |

FOREIGN PATENTS 936,561   9/1963   Great Britain.

DANIEL E. WYMAN, Primary Examiner.

ALPHONSO D. SULLIVAN, Examiner.

J. E. DEMPSEY, Assistant Examiner.